United States Patent [19]
Wood et al.

[11] 3,903,232
[45] Sept. 2, 1975

[54] DENTAL AND BIOMEDICAL FOAMS AND METHOD

[75] Inventors: Louis Leonard Wood, Rockville, Md.; Kurt Charles Frisch, Grosse Ile, Mich.

[73] Assignee: W. R. Grace & Co., New York, N.Y.

[22] Filed: Feb. 19, 1974

[21] Appl. No.: 443,271

Related U.S. Application Data

[63] Continuation-in-part of Ser. No. 404,823, Nov. 9, 1973, which is a continuation-in-part of Ser. No. 250,012, May 3, 1972, abandoned.

[52] U.S. Cl. ............ 264/157; 15/104.02; 32/15; 128/285; 128/290 R; 260/2.5 AD; 260/2.5 AM; 260/2.5 AP; 260/2.5 BD; 264/321; 424/27
[51] Int. Cl.² .............. A61F 13/18; A61F 13/20; B29C 15/00; C08G 18/14
[58] Field of Search ............ 128/285, 290 R; 260/2.5 AD, 2.5 A, 2.5 AM, 29.2 TN, 260/2.5 AP, 2.5 BD; 32/15; 264/157, 321

[56] References Cited
UNITED STATES PATENTS

| | | | |
|---|---|---|---|
| 2,726,219 | 12/1955 | Hill | 260/2.5 AP |
| 2,901,445 | 8/1959 | Harris | 260/2.5 AP |
| 3,294,724 | 12/1966 | Axelrood | 260/29.2 TN |
| 3,306,966 | 2/1967 | Matejcek | 128/285 |
| 3,369,544 | 2/1968 | Crockford | 128/285 |
| 3,384,361 | 3/1961 | Brower | 260/2.5 AD |
| 3,384,506 | 5/1968 | Elkin | 260/2.5 AD |
| 3,563,943 | 2/1971 | Davis | 260/29.2 TN |
| 3,646,178 | 2/1972 | Traubel | 260/29.2 TN |
| 3,691,271 | 9/1972 | Charle | 128/285 |
| 3,694,301 | 9/1972 | Gruenewald | 161/170 |
| 3,781,231 | 12/1973 | Janssen | 260/2.5 BE |
| 3,793,241 | 2/1974 | Kyle | 260/2.5 AM |
| 3,794,029 | 2/1974 | Dulle | 128/285 |
| 3,812,618 | 5/1974 | Wood | 260/2.5 AK |
| 3,812,619 | 5/1974 | Wood | 260/2.5 AT |

*Primary Examiner*—Donald E. Czaja
*Assistant Examiner*—C. Warren Ivy
*Attorney, Agent, or Firm*—Eugene M. Bond

[57] ABSTRACT

The invention disclosed is directed to dental and biomedical foam structures prepared by using an isocyanate capped polyoxyethylene polyol reactant with large amounts of an aqueous reactant. Sections of the resultant foam are compressed to a fraction of the original volume for ease and economy in handling, and upon contact with liquids or body fluids, the compressed foam section is readily regenerated to its original size and shape.

12 Claims, No Drawings

DENTAL AND BIOMEDICAL FOAMS AND METHOD

This application for U.S. Letters Patent is a continuation-in-part of application Ser. No. 404,823, filed Nov. 9, 1973, which in turn is a continuation-in-part of application Ser. No. 250,012, filed May 3, 1972, now abandoned.

This invention relates to a method for preparing new dental and biomedical foams using a hydrophilic cross-linked polyurethane foam.

Numerous devices have been proposed in the prior art for use as dental and biomedical foams for absorbing or removing body fluids. Typically, the prior art approaches have relied upon natural materials such as cotton, which is now becoming relatively expensive while providing a resultant structure which is generally fragile in use. Also, the amount of absorption by natural materials is relatively low. It has now been found, however, that by practice of the present invention, there is provided a method for preparing simple and highly efficient dental and biomedical foams which are readily compressed until use, and which are characterized by high absorptive ability of body fluids in use.

Various attempts have also been made in the prior art to prepare foams of organic substances for use in cavities of the human body. However, such organic substance typically require, for example, catalysts or the like during the foaming reaction. These additives remain in the foam after foaming and are readily leached into the human body when in contact with body fluids. Thus, although artificial foams of the prior art possess the capacity of high absorptivity of body fluids, usage within the human body typically invites disadvantages beyond advantages realized by low cost and high absorptivity. Thus, artificial foams of the prior art have received limited practical acceptance by the medical, dental and government regulatory agencies when proposed for internal usage in the human body.

By the present method, dental and biomedical foam structures may be prepared using hydrophilic cross-linked polyurethane foams by reacting a particular isocyanate capped polyoxyethylene polyol with large amounts of an aqueous reactant. The thus generated foams are configurated to handy size and compressed. The compressed configuration is maintained until use whereupon the foam structure returns to normal size when in contact with body fluids. Thus, compressed structures may be readily inserted such as in the oral cavity while in a conveniently compressed size and while in the oral cavity, the structure regenerates to its original size while in contact with oral fluids.

The present foams have utility as handy expandable sponges for personal use. Because of the compressed size, the sponges are easily carried and may be readily prepared with detergents, lotions, perfumes, biostats and the like and upon contact with water, the sponges expand to a useful very soft, very hydrophilic sponge. The expanded sponges may be used for washing, wiping, cleansing, etc. for external body cleaning; or alternatively for internal body usage such as is necessary in dental and medical applications. The present sponges also have utility as intimate absorptive products such as diapers, sanitary napkins, incontinent pads i.e. catamenial devices such as tampons, and the like. A number of methods may be used to compress and section the present foam structures to size. One such method is disclosed by Crockford in U.S. Pat. No. 3,369,544, the disclosure of which is incorporated herein by reference for one means of compressing and cutting sections of foam.

Polyurethane foam structures prepared herein with polyoxyethylene polyisocyantes, water and certain surfactants, have an exceptionally fine, uniform, soft, hydrophilic cell structure. Upon drying these foams can be compressed into much smaller than original volume. Upon exposure to water the foams regain their original volume and other properties.

The following conditions seem to be important to obtaining foams of the above mentioned desirable properties.

One mole of a polyoxyethylene diol of molecular weight less than 1,500 containing about 0.1 to about 1.0 mole, preferably about 0.2 to about 0.6 moles of polyols with 3 or greater hydroxyl groups per molecule, preferably glycerol, trimethylol propane, pentaerythritol, are capped with diisocyanates. The useful range of polyisocyanates is about 0.60 to about 1.0 moles of diisocyanate per equivalent of hydroxyl groups in the polyol mixture. The preferred range of diisocyanate is about 0.75 to about 0.95 moles of diisocyanate per equivalent of hydroxyl groups.

The resultant polyether polyisocyanate prepolymers are foamed by reacting with about 10 to about 200 parts of water, preferred range of about 50 to about 160 parts of water, to 100 parts of prepolymer in the presence of about 0.5 to about 30 parts surfactant, preferred range of about 1 to about 15 parts surfactant, per 100 parts of prepolymer. The surfactants can be added either to the prepolymer or the water. Surfactants which are soluble in water and/or in their own right are hydrophilic, are preferred.

The polyurethane foams made in the manner described above are exceptionally soft, hydrophilic and compressible as compared to conventional polyurethane foams. The foams described above can be dried and compressed to form soft dense materials which, upon exposure to water, instantly absorb water and expand back to their original volume.

A low density foam is thus prepared which can be compressed to a fraction of its original volume for ease and economy in handling and shipping, but is readily regenerated to its original size and shape. When warm and/or wet the foam is useful for its flexibility, softness and hydrophilicity.

The original foam size and shape is regenerated within 5 minutes by either warming or contacting the foam with water. The foam is soft and flexible when wet and/or warm and rigid when cold and/or dry.

The present foams may be characterized as low density polyurethane foam (1 to 3 lbs/ft$^3$) which is easily compressed to one-fifteenth to one-twentith its original size along one dimension and retains this compressed state below 50°C and/or when dry indefinitely.

Preparation of the present foam structures will become more apparent for the following detailed description.

During capping, it is desirable that polyisocyanate be reacted with the polyol such that the reaction product, i.e., the capped product, is substantially void of reactive hydroxy groups while containing more than two reactive isocyanate sites per average molecule. Another route for achieving this desired result is to react a polyisocyanate having two reactive active isocyanate sites per average molecule, in a reaction system during foaming having a polyfunctional reactive component such as one having from three up to about eight or more reactive amine, hydroxy, thiol, or carboxylate sites per average molecule. These latter sites are highly reactive with the two reactive isocyanate sites and thereby form a dimensional product.

Polyoxyethylene polyol used as a reactant in preparing the capped product to be foamed may have a weight average molecular weight of about 200 to about 1,500, and preferably between about 600 to 1000, with a hydroxyl functionality of 3 or greater, preferably from about 3 to about 8.

Polyoxyethylene polyol is terminated or capped by reaction with a polyisocyanate. The reaction may be carried out in an inert moisture-free atmosphere such as under a nitrogen blanket at atmospheric pressure at a temperature in the range of from about 0° to about 120°C. for a period of time of about 20 hours depending upon the temperature and degree of agitation. This reaction may be effected also under atmospheric conditions provided the product is not exposed to excess moisture. The polyisocyanates used for capping the polyoxyethylene polyol include polyisothiocyanates, polyisocyanates which are PAPPI-1 (polyaryl polyisocyanate as defined in U.S. Pat. No. 2,683,730), tolylene diisocyanate, triphenylmethane-4, 4′, 4″ , -triisocyanate, benzene-1,3,5-triisocyanate, hexamethylene diisocyanate, xylene diisocyanate, chlorophenylene diisocyanate, diphenylmethane-4,4′-diisocyanate, naphthalene-1, 5-diisocyanate, xylene-alpha, alpha′-diisothiocyanate 3,3′-dimethyl-4,4′-biphenylene diisocyanate, 2,2′, 5,5′-tetramethyl-4, 4′-biphenylene diisocyanate, 4,4′-methylenebis (phenylisocyanate), 4,4′-sulfonylbis (phenylisocyanate), 4,4′J-methylene di-orthotolylisocyanate, ethylene diisocyanate, ethylene diisothiocyanate, trimethylenediisocyanate and the like. Mixtures of any one or more of the above mentioned organic isothiocyanates or isocyanates may be used as desired. The aromatic diisocyanates and polyisocyanates or mixtures thereof which are especially suitable are those which are readily commercially available, have a high degree of reactivity and a relatively low cost.

Capping of the polyoxyethylene polyol may be effected using stoichiometric amounts of reactants. Desirably, however, an excess of isocyanate is used to insure complete capping of the polyol. Thus, the ratio of isocyanate groups to the hydroxyl groups used for capping is between about 1 to about 4 isocyanate to hydroxyl, and preferably about 2 to about 3 isocyanate to hydroxyl molar ratio. In order to achieve an infinite crosslinked network formation on foaming, the reactive components may be formulated in one of the following by way of example. First, when water is the sole reactant with the isocyanate groups leading to chain growth during the foaming process, the isocyanate capped polyoxyethylene polyol reaction product must have an average isocyanate functionality greater than 2 and up to about 6 or more depending upon the composition of the polyol and capping agent components. Secondly, when the isocyanate capped polyoxyethylene polyoxyethylene polyol has an isocyanate functionality of only about two, then the aqueous reactant, may contain a dissolved or dispersed isocyanate-reactive crosslinking agent having an effective functionality greater than two. In this case, the reactive crosslinking agent is reacted with the capped polyoxyethylene polyol when admixed during and after the foaming process has been initiated. Thirdly, when the isocyanate capped polyoxyethylene polyol has an isocyanate functionality of only about two, then a polyisocyanate crosslinking agent having an isocyanate functionality greater than two may be incorporated therein, either preformed or formed in situ, and the resultant mixture may then be reacted with the aqueous reactant, optionally containing a dissolved or dispersed reactive isocyanate-reactive crosslinking agent, leading to a crosslinked, infinite network hydrophilic polyurethane foam.

Several different modes may be used to prepare the hydrophilic capped polyoxyethylene polyol reaction product having an average isocyanate functionality greater than two. One useful mode is to polymerize ethylene oxide in the presence of a polyfunctional hydroxyl containing starter component such as glycerol, trimethylolpropane, or trimethylolethane and the like which leads to polyoxyehylene triols. The molecular weight of these polymeric triols so prepared may be varied greatly depending on the number of moles of ethylene oxide used in the reaction with the starter component. Starter components such as pentaerythritol and sucrose likewise treated with ethylene oxide lead to polymeric polyoxyethylene tetrols and hexols, respectively. Alternatively, polyols suitable for capping with polyisocyanate may be prepared from diols, triols, tetrols, hexols and polycarboxylic acids such as by the following mode:

Reaction I

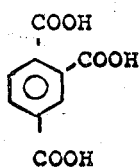 + 3 HO~~~OH PEG / -3H₂O → 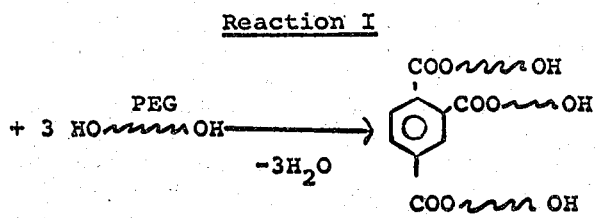

A useful polyisocyanate may be prepared from the reaction of a polyol with excess diisocyanate such as by the following mode:

Reaction II

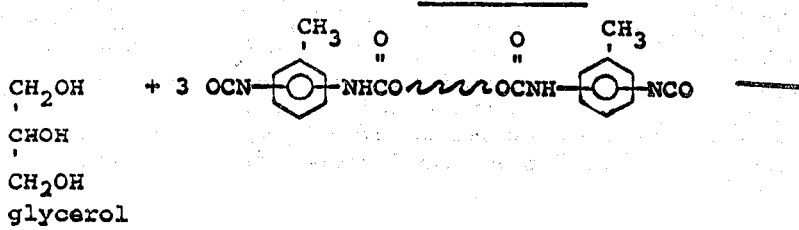

Reaction II—Continued

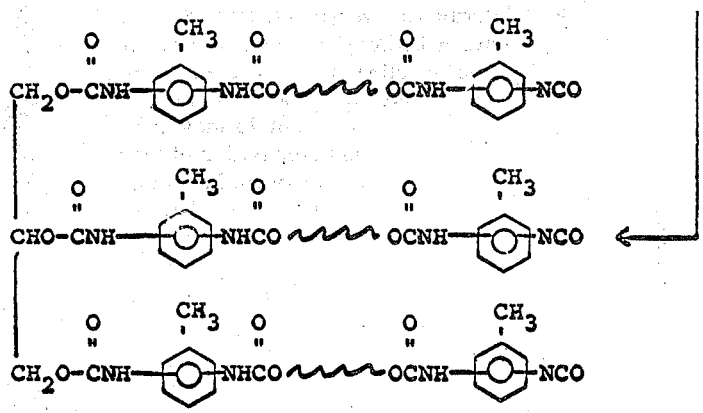

Polyoxyethylene diols, triols, tetrols or hexols may be capped with isocyanate end groups by reaction with an appropriate amount of a polyisocyanate. The end capping reaction may be exemplified by the following illustrative equation:

Reaction III

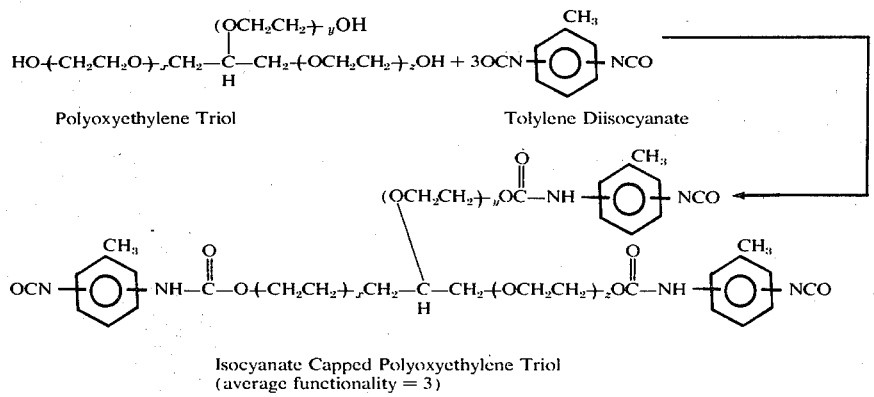

Isocyanate Capped Polyoxyethylene Triol
(average functionality = 3)

Obviously the exact structure of the isocyanate capped polyoxyethylene polyols may be very complex and the simplified version shown in the above reactions is for purposes of illustration only. Further, blends or mixtures of the various polyols and/or polyisocyanates may be used as desired so long as the total average isocyanate functionality of the final urethane containing reaction product is greater than two.

Another possible mode used to prepare the capped polyoxyethylene polyol reaction product having an average isocyanate functionality greater than two is by reacting polyoxyethylene glycol having a reactive functionality equal to 2, with a molar excess of a diisocyanate which leads to an isocyanate capped polyurethane product (A) having an isocyanate functionality of two. A polyol such as pentaerythirtol having a reactive functionality equal to 4 is reacted with a large molar excess of a diisocyanate to form an isocyanate capped polyurethane intermediate product (B) having an isocyanate functionality of four. By blending the two isocyanate capped products thus prepared, i.e., products (A) and (B), in various molar proportions, the resulting product mixture has an average isocyanate functionality greater than two and on treatment with aqueous reactants will lead to new improved hydrophilic crosslinked polyurethane foams illustrative of the present invention. In addition, other monomeric or polymeric polyisocyanate crosslinking agents may be substituted for the tetraisocyanate product (B). Tolylene-2,4,6-triisocyanate having a reactive functionality of 3 is an example of a simple monomeric triisocyanate which may be usefully employed to achieve the same objective of imparting to the system an average isocyanate functionality greater than two. An example of a polymeric triisocyanate which may be similarly used is that shown in the descriptive Reaction III.

Still another useful mode within the scope of this invention for preparing crosslinked hydrophilic polyurethane foams is by using an isocyanate capped polyoxyethylene polyol reaction product having an average functionality of about two or greater which may be prepared as described previously. The technique following is crucial for those formulations where the average isocyanate functionality is only about two, because in these instances treatment with a large amount of water slurry in foaming yields only a substantially linear, soluble thermoplastic foam having very little, if any, practical or commercial utility. Thus, when it is desired to carry out the foaming reaction using this latter technique, the aqueous reactant used, is pre-treated to contain a polyfunctional crosslinking agent which is reactive with isocyanate end groups of the capped reaction product. Such crosslinking agents may be solubilized or dispersed in the aqueous reactant, and must be sufficiently compatible with the capped reaction product to be able to react with the isocyanate groups and thus cause a crosslinked, insoluble, thermosetting network to form while the foaming process takes place. In this technique, then, a crosslinking agent reactive with isocyanate groups is contained in the water slurry, i.e., aqueous reactant. After mixing with the isocyanate capped polyoxyethylene polyol reaction products, a crosslinking reaction results which takes place during and after the foaming step begins to take place. The presence of the crosslinking agent in the water or aqueous reactant is crucial when the isocyanate capped reaction product has a functionality of only about two and only optional when the functionality thereof is greater than two.

Water soluble or water dispersible crosslinking agents operable in this invention desirably should be polyfunctional and reactive with isocyanate groups and include but are not limited to materials such as diethylenetriamine, triethylenetetramine, tetraethylenepentamine, polyethyleneimine, glycerol, trimethylolpropane, pentaerythritol, tolylene-2,4,6-triamine, ethylene diamine, amino-ethanol, trimethylenediamine, tetramethylenediamine, pentamethylene-diamine, hexamethylenediamine, ethanolamine, diethanolamine, hydrazine, triethanolamine, benzene-1,2,4-tricarboxylic acid, nitrilotriacetic acid, citric acid, 4,4'-methylenebis(o-chloroaniline), and the like. The water soluble or water dispersible crosslinking agents chosen are those which cause a crosslinked network to form during or after the foaming process begins to take place.

It has also been found that the capped polyoxyethylene polyol having an isocyanate functionality greater than two used to prepare a three dimensional network polymer must be present in an amount sufficient to insure formation of the dimensional network. Thus, amounts of the capped polyoxyethylene polyol having an isocyanate functionality greater than two in the component to be foamed range from about 3% by weight of this component up to 100% by weight. Thus, it is possible to include a capped polyoxyethylene polyol having a terminal member with an isocyanate functionality of two, i.e., a diisocyanate in an amount from 0% by weight up to about 97% by weight of the component to be foamed. The maximum amounts of diisocyanate used are limited to that necessary to permit crosslinking to take place during foaming, as contrasted to formation of a linear polymeric structure, and the properties desired in the finally prepared foam.

The polyoxyethylene polyols used herein are water soluble reaction products derived from the polymerization of ethylene oxide in the presence of a polyfunctional starter compound such as water, ethylene glycol, glycerol, pentaerythritol, sucrose and the like. The molecular weights may be varied over a wide range by adjusting the relative ratios of ethylene oxide monomer to starter compound. The preferred molecular weight ranges have been described previously.

It is possible and sometimes desirable to incorporate small amounts of a relatively hydrophobic comonomer into the ethylene oxide based polymerization products. Thus, comonomers such as propylene oxide or butylene oxide may be copolymerized as a random copolymer, block-copolymer, or both, such that the copolymers remain hydrophilic while having other desirable features for certain applications, namely, improved low temperature flexibility, resistance to compression set, resiliency and the like. Up to about 40 mole percent but desirably about 25 mole percent or less of the relatively hydrophobic comonomer may be copolymerized with the ethylene oxide monomer and still yield hydrophilic crosslinked network foams when those products are used as polyol intermediates. Thsu, as used herein, the term "polyoxyethylene polyol" is intended to include not only homopolymers of ethylene oxide but also hydrophilic copolymers of ethylene oxide such as those described above wherein all of these polyol derivatives have a hydroxyl functionality of about two or greater and an ethylene oxide content ranging from about 60 mole percent to about 100 mole percent, and preferably greater than about 75 mole percent.

To effect foaming and preparation of the crosslinked network polymer, the component including the isocyanate capped polyoxyethylene polyol having a functionality about 2 or greater is simply combined with the aqueous component. For simplicity, this isocyanate capped reaction component will herein be referred to as resin reactant.

The aqueous component, i.e., water slurry or suspension, may include various additives such as detergents, biostats, perfumes or the like as desired for use in a given product. Obviously, additives are avoided or carefully selected for specific purposes for foam structures intended for internal body usage.

The dramatic way in which additions of water influences practice of the present invention is by consideration of the following water index value:

$$\text{Water index value} = \frac{\text{equivalents of } H_2O}{\text{equivalents of NCO}} \times 100$$

In polyurethane foam processes, the known chemical reaction of isocyanate with water proceeds as follows:

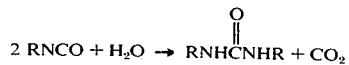

$$2 \text{ RNCO} + H_2O \rightarrow \text{RNHCNHR} + CO_2$$

Thus, because one-half mole of water is equal to one equivalent of isocyanate, where 0.5 m $H_2O$ is used with 1 eq. NCO, the water index value is 100.

An Index of 100 indicates that both equivalents are equal or "balanced." An Index of 95 indicates that there is a 5% shortage of water while an Index of 105 indicates a 5% surplus of water. A slight theoretical excess of isocyanate, usually 3–5%, is common practice, in the prior art particularly with flexible foams.

Using the present resin reactant and water in amounts from about 0.5 mole $H_2O$/mole NCO groups ($H_2O$ Index Value of 100) up to about 2 moles $H_2O$/mole NCO groups ($H_2O$ Index Value of 200), there results poor foaming unless materials such as surfactants or the like are included. Amounts up to about 2 moles $H_2O$/mole NCO ($H_2O$ Index Value of 200) require a catalyst. When using about 6.5 moles $H_2O$/mole mole/NCO groups, ($H_2O$ Index Value 78,000), surprisingly good foams result which improve in characteristics with added amounts of molar water. Thus, the available water content in the aqueous reactant is from about 6.5 to about 390 moles $H_2O$/NCO groups in the resin reactant, i.e. an $H_2O$ Index Value of about 1300 to about 78,000 and desirably from about 4,000 to about 40,000, i.e. about 20 to about 200 moles $H_2O$/NCO groups.

"Available water" in the aqueous reactant is that water accessible fro reaction with the resin reactant, and which is exclusive of water which may layer during reaction, or supplemental water which may be necessary because of additives present in and forming the aqueous reactant.

Because large amounts of water are in the aqueous reactant during reaction, i.e., the present system is not dependent upon a molar NCO-water reaction, it is possible to combine a great variety of materials in the aqueous reactant which are otherwise not possible with limited water reacting systems.

The aqueous reactant may be used at temperatures from about 2° to about 100°C. as desired.

Although foaming of the present resin reactant, i.e., prepolymer, is effected simply, it is also possible to add, although not necessary, supplemental foaming materials such as those well known to the artificial sponge foaming art.

After foaming has been effected, the foam may be dried, is desired, under vacuum from 1 to 760 Torr at a temperature of about 0° to about 150°C. when used internally, the foams may be heat or chemically sterilized prior to use.

The following examples will aid in explaining, but should not be deemed as limiting, practice of the present invention. In all cases, unless otherwise noted, all parts and persentages are by weight.

EXAMPLE 1

To a reaction vessel containing 3,092 grams, representing 1 mole, 3 eq. OH, of a triol prepared from potassium hydroxide catalyzed reaction of 92 grams anhydrous glycerol with 3300 grams of ethylene oxide, were added 522 grams, representing 3 moles, 6 eq. NCO of tolylene diisocyanate having about 80/20 mixture of 2,4 isomer/2,6 isomer. The reaction exotherm was kept at 70°C. by external cooling with water, while stirring for 4 hours. The actual isocyanate content, determined by titration with standard n-butylamine solution in toluene, remained at the constant level of 0.79 meq. NCO/-gram relative to ,a theoretical content of 0.83 meq. NCO/gram. The resultant pale yellow syrup was found to solidify at about 30°–35°C., was soluble in toluene, and acetone, readily reacts with water, and had the following formula:

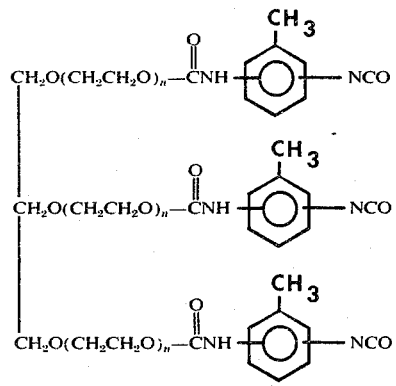

where $n$ has an average value of about 22. The theoretical molecular weight of the resin product is about 3615.

100 grams of the recovered capped resin was poured into the mold cavity through an open port provided in the cover plate. Thereafter 1000 grams of water was added with stirring. A small uniform open cell structure resulted which was dried at 130°C. at 10 Torr to give a dry foamed structure. The foam was compressed and cut into sections by the method of U.S. Pat. No. 3,369,544.

EXAMPLE 2

To a reaction vessel containing 4,136 grams, representing 1 mole, 4 eg. OH, of a tetrol prepared from sodium methoxide catalyzed reaction of 136 grams pentaerithritol with 4400 grams of ethylene oxide, were added 696 grams of tolylene diisocyanate having about 80/20 mixture of 2,4 isomer/2,6 isomer. The reaction was carried out using the procedure of Example 1. The actual isocyanate content noted was 0.86 meq. NCO/-gram relative to a theoretical content of 0.83 meq. NCO/gram. The recovered product was a colorless syrup which solidified at about 35°–40°C., was soluble in toluene and acetone, readily reacts with water, and had the formula:

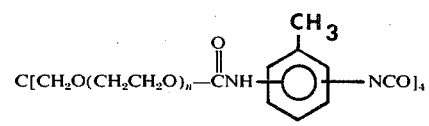

where $n$ has an average value of about 22. The theoretical molecular weight of the resin product is about 4832.

Using the molding procedure of Example 1, 19.2 grams, representing 0.016 eq. NCO, of the recovered capped resin product from this example, were reacted with 20 grams water, about 1.1 moles. The moles $H_2O$/NCO groups was 73.2 or an Index Value of 14,640. The final foam value was about 275 ml. The percent gel was greater than 95%. The resultant foam composition was dried at 100°C. at 10 Torr to give a dry foamed structure.

Following the compressing and severing procedure of Example I, corresponding results were realized.

EXAMPLE 3

A solution of 92 grams glycerol representing 1 mole, 3 eg. OH, and 1000 grams of polyoxyethylene glycol 1000 representing 1 mole, 2 eg. OH was outgassed at 100°C. and 10 Torr for two hours. To the outgassed solution was added 870 grams representing 5 moles tolylene diisocyanate having an 80/20 mixture of 2,4 isomer/2,6 isomer. The reaction solution was stirred at 60°C. for 4 hours whereupon the actual isocyanate content reacted a constant 2.49 meq. NCO/gram relative to a theoretical content of 2.54. The resin product had a pale orange color, a density of 1.10, and a viscosity (Brookfield No. 4 spindle) at 25°C. of 13,400 cps. 31.3 parts of the resin product representing 50 mole percent had a theoretical molecular weight of 615, and the following formula (idealized):

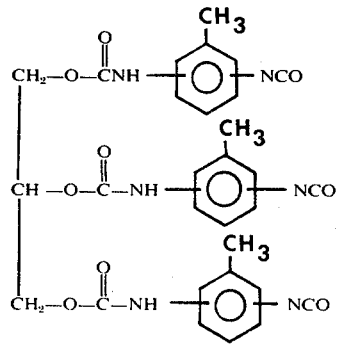

while 68.7 parts of the resin product representing 50 mole percent was found to be

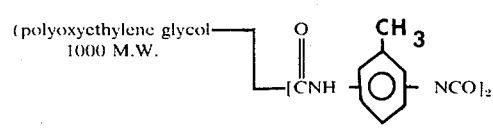

having a theoretical molecular weight of 1348. The actual NCO content of this resin product was 2.49 meq. NCO/gram relative to a theoretical content of 2.54 meq. NCO/gram. To 100 grams of the recovered capped resin was added with stirring 100 grams water. A small uniform open cell structure resulted. Corresponding results to that of Example I were realized.

EXAMPLE 4

The procedure of Example 3 was repeated except using polyoxyethylene glycol having a weight average molecular weight of 4,000. Corresponding results were realized.

EXAMPLE 5

200 grams of diisocyanate capped polyoxyethylene glycol resin product having the formula:

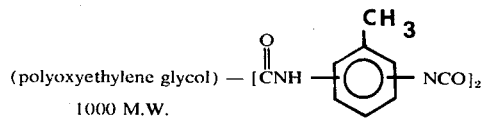

(polyoxyethylene glycol) — [$\overset{O}{\overset{\|}{C}}$NH —⟨ring⟩— $CH_3$ NCO]$_2$
1000 M.W.

with a molecular weight, theory, of 1348, and an actual NCO content of 1.42 meq. NCO groups/gram relative to 1.49 meq. NCO groups/gram theory, was reacted with a polyamine during foaming using 0.34 grams diethylene triamine (DETA), and 400 grams slurry containing 200 grams water, 50% by weight hafnium titanate. The resultant foam composition was dried at 130°C. at 10 Torr to give a dry foamed structure. The resultant product was found to have excellent fluid absorptive characteristics.

EXAMPLE 6

The procedure of Example 1 was repeated except using a resin prepared by capping a polyoxyethylene diol with a polyisocyanate having a functionality greater than 2, to give polyisocyanate foams with higher crosslink density and superior physical properties, lower solubility, and greater stability than foams from polyoxyethylene diisocyantes. Thus a 1000 gram portion, 0.25 eq. OH, of polyoxyethylene glycol of 4000 weight average molecular weight was outgassed at 110°C. and 10 Torr for two hours. Next, to this outgassed liquid was added at 60°C. 200 grams, 0.5 moles, 1.5 eq. NCO, of polymethylene polyphenylisocyanate commercially available under the name PAPI by Upjohn Co. This latter material has nearly three isocyanate groups per molecule and an isocyanate equivalent weight of 133. A dark reaction solution was noted which was stirred at 60° to 70°C. for 5 hours whereupon the NCO content reached a constant 0.825 meq. NCO/gram relative to a theoretical value of 0.833. The resultant dark product syrup solidified at 45°C. to form a brown, waxy product. The resultant resin was foamed using the procedure of Example I. Corresponding results were realized.

EXAMPLE 7

In order to illustrate use of copolymers of 75% ethylene oxide and 25% propylene oxide along with methylene dicyclohexyl diisocyanate to form a triisocyanate that readily reacts with water to give hydrophilic foams, a mixture of 13.4 grams, 0.1 mole of trimethylolpropane and 0.6 grams, 0.01 mole of potassium hydroxide was stirred at 100°–180°C. in the presence of 250 grams of ethylene oxide at 20 to 100 psi. After 3 hours the reaction pressure dropped to one atmosphere. To the reaction product syrup was then added 250 grams of propylene oxide with stirring at 100° to 180°C., and a pressure of 20 to 75 psi for 4 hours whereupon the reaction pressure at 100°C. dropped to one atmosphere. To this reaction product syrup having a brown color was added 500 grams of ethylene oxide. The reaction was stirred at 100°–180°C. for 12 hours whereupon the reaction pressure dropped to one atmosphere at 100°C. The resultant brown oil was stripped of volatiles at 50 to 100°C. at 10 Torr resulting with 978 grams of brown syrup having a hydroxyl content of 0.32 meq. OH/gram relative to 0.31 meq./gram theory.

To 931 grams, 0.30 OH, of the prepared triol was added 88.0 grams, 0.32 moles, of dicyclohexylmethane diisocyanate. The solution stirred at 60°C. for 8 hours whereupon the NCO content of the polymer reached a constant 0.33 meq./gram relative to 0.32 theory. The triisocyanate product was characterized as a light amber syrup having a viscosity of 12,000 cps at 25°C. (Brookfield).

To a 10 gram portion of the above triisocyanate containing 0.1 gram of silicone surfactant L-520 by Union Carbide was added with good mixing 20 grams of water.

The procedure of Example I was then repeated with corresponding results.

EXAMPLE 8

In order to illustrate preparation of a flexible hydrophilic foam from a polyoxyethylene polyol having a hydroxyl functionality greater than two, a polyisocyanate plus catalysts and surfactants were all reacted together at the same time in a one shot manner with large amounts of water as follows. 30.9 grams, 0.01 mole having 0.03 eq. OH of polyoxyethylene triol, having a weight average molecular weight of 3092 and prepared as described in Example 1 was mixed with 5.5 grams of diisocyanate, 0.0305 mole, 0.063 eq. NCO, 0.1 gram L520 silicone surfactant by Union Carbide, and 0.05 gram dibutyl tin dilaurate plus 0.05 gram N-methyl diethanol amine. To this mixture was added immediately 100 grams of water and 1% by weight biostat agent with vigorous stirring prior to introduction into a mole. The product foam was found useful for external body cleansing.

EXAMPLE 9

In order to illustrate use of copolymers of 10% butylene oxide and 90% ethylene oxide along with 4,4'diphenylmethane diisocyanate to prepare a water soluble tetraisocyanate which easily forms hydrophilic foams upon mixing with water, 13.6 grams, 0.1 mole anhydrous pentaerithritol containing 0.5 grams of freshly prepared triethyl oxonium fluoroborate in 250 grams of ethylene oxide was stirred at 50°–100°c. at 20-5- psi for 45 minutes whereupon the pressure dropped to 1 atmosphere. To this brown oil at 10°C. was added a solution of 100 grams tetrahydrofuran freshly distilled from sodium hydride, in 650 grams of ethylene oxide, over a period of 45 minutes. The reaction was stirred at 10°–20°C. for 2 hours, then at 20°–40°C. for 1 hour whereupon the reaction pressure dropped to 1 atmosphere. The resultant brown oil was stripped of volatiles at 50°–60°C. at 10 Torr to give 988 grams of a tan oil having a hydroxyl content of 0.405 meq. OH/gram relative to 0.394 theory.

To 247 grams, 0.1 eq. OH, of the prepared tetraol was added 26.2 grams of diphenylmethane-4,4′diisocyanate, 0.105 mole, and the reaction solution stirred at 60°C. for 5 hours whereupon the isocyanate content reached a constant value of 0.380 meq./gram relative to theoretical value of 0.385. The tetraisocyanate product was an amber syrup having a viscosity of 15750 cps. at 25°C. (Brookfield).

To a 10 gram portion of the tetraisocyanate containing 0.1 gram of the silicone surfactant L520 by Union Carbide was added with good mixing 10 grams of water with 5 grams of detergent. Corresponding results to that of Example 8 were realized.

EXAMPLE 10

A slurry of 100 grams of pentaerythritol, 0.735 moles having 2.94 eq. OH in 860 grams of tolylene diisocyanate, 4.95 moles having 9.9 eq. NCO groups/gram and the mixture ratio 80/20 of 2,4 isomer/2,6 isomer was stirred for 24 hours. An orange solution resulted. To the orange solution was added 1000 grams outgassed polyoxyethylene glycol representing 1 mole having 2.0 eq. OH. These reactants were stirred about 67°C. for 4 hours followed by additional stirring at 25°C. for 16 hours whereupon the isocyanate content reached a constant level of 2.63 meq. NCO groups/gram. relative to theoretical value of 2.56 meq. NCO groups/gram. The resultant product had an orange color, a viscous syrup consistency at 25°C., and upon analysis was found to be a solution of about 31% by weight (42.5 mole %) of the compound:

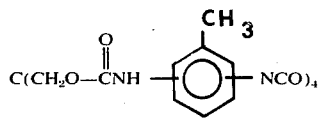

having a molecular weight, theory, of 832, in about 69% by weight (57.5 mole %) of

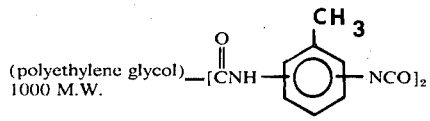

The NCO content of the mixture was 2.63 meq. NCO groups/gram actual, relative to 2.56 meq. NCO groups/gram, theory.

This resin product was foamed using the procedure of Example I. Corresponding results were realized.

EXAMPLE 11

To 1030 grams representing 1 eq OH of a triol prepared from 92 grams, 1 mole, glycerol and 3030 grams ethylene oxide, were added 168 grams, 1 mole of 1,6-diisocyanatohexane. The reaction solution was stirred at 60° to 70°C. for 6 hours whereupon the isocyanate content of the resin product reached a constant of 0.827 meq NCO/g relative to a theoretical value of 0.835. The resultant pale yellow product syrup solidified to a waxy solid at 35° to 40°C., and was found upon analysis to have the following formula (idealized):

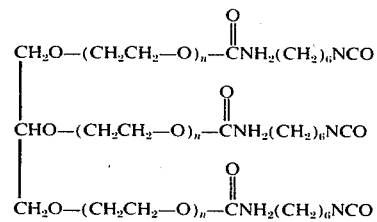

where $n$ is about 25 and the molecular weight, theory, is 3594. The resin product was reacted using the procedure of of Example 1. Corresponding results were realized.

EXAMPLE 12

The procedure of Example 5 was repeated except using a polyol during foaming in place of the polyamine. 0.62 gram of the glycerol was used as the polyol. Also, the slurry was composed of 200 grams water and 10 grams commercially available biostat.

EXAMPLE 13

The procedure of Example 12 was repeated except using a polythiol during foaming in place of the polyol. 12 grams of tetrakis (β-mercaptopropionate) commercially available from Carlisle Chemical Co. under the tradename Q 43) was used as the polythiol. Corresponding results were realized.

EXAMPLE 14

The procedure of Example I was repeated except using 2/1 ratio of polyethylene glycol (M. W. 600) capped with two moles of tolylene diisocyanate and trimethylpropanol capped with three moles of tolylene diisocyanate. Warm 1 inch × 1 inch × 2 inches dry sections were readily compressed into neat ⅜inch diameter × ¾inch long hard pellets. Upon exposure to water the sections regained the original size within 2 minutes. These foams are obviously very attractive for internal usage since they do not include unnecessary additives which may leach out during usage. A quick water uptake study on the 1 inch × 1 inch × 2 inches sections of the present foams showed:

| Weight Dry | Weight Soaked | Weight Squeezed |
|---|---|---|
| 1.3 g. | 43.6 g. | 3.6 g. |

EXAMPLE 15

A series of foams were prepared, using the procedure of Example I, by reacting while stirring 100 parts of prepolymer with 30 parts water and 5 parts Plurafac B-26, a polyoxyalkylene nonionic surfactant by Wyandotte Chemicals Corp. The prepolymer was prepared by reacting polyethylene glycol (M.W. 1000) and trimethylol propane in a ratio of 2:0.125 to 2:2 respectively following which the reaction product is capped at all hydroxy locations using tolylene diisocyanate having about 80/20 mixture of 2,4 isomer /2,6 isomer. A quick water uptake study on the 1 inch × 1 inch × 2 inches sections of the present foams showed:

| Weight Dry | Weight Soaked | Weight Squeezed |
|---|---|---|
| 1.8 g. | 49.3 g. | 4.5 g. |

EXAMPLE 16

A mixture of 150g prepolymer prepared using a 2:1 molar ratio of polyethylene glycol (M.W. 600) and trimethylol propane capped with 0.95 theroretical quantity of TDI, to which was added 6% by weight more TDI, and 3g of Union Carbide's L-520 silicone surfactant, was mixed with 150g of water at 25°C. Within 40 seconds a homogeneous creamy froth formed. After 5.25 minutes the foam expanded to its maximum volume and remained there (6 inches cube). After 10 minutes the foam had a tack-free surface. This 6 inches cube of foam was soft and flexible, and upon drying overnight at 28°C, the foam became rigid and had a volume of 5.8 inches cube.

Thick sections, 5 inches × 3 inches × 1 inch, cut from the cube were compressed at 10000 psi cold or hot to give 5 inches × 3 inches × 1/16 inch thick sheet. Warming the sheet to 100°C or immersion in water (25°C) gave the original fully expanded foam within 4 minutes.

EXAMPLE 17

A mixture of 20 g prepolymer prepared using a 2/0.25 molar ratio of polyethylene glycol, (A.W. 1000) and glycerol, capped with 0.95 theoretical quantity of required TDI and 1g Wyandotte's plurofac B-26 surfactant was mixed with 6g of water at 25°C. Within 0.25 min the mixture was a homogeneous solution and foaming started (cream time). At 2.25 min the foam reached and stayed at its maximum volume of 400 ml. After 8 min the polymer was essentially tack free. The foam matrix was very soft, fine celled, extremely hydrophilic and compressible. Upon drying, the foam could be compressed at 1000 psi, 25°C to hold half to one-fourth its original volume. Upon exposure to water the compressed foam expanded immediately to its original size and properties.

EXAMPLE 18

The procedure of Example 17 was repeated, but in this case the Plurofac B-26 was added to the water instead of the prepolymer. The same results were obtained.

It is understood that the foregoing detailed description is given merely by way of illustration and that many variations may be made therein without departing from the spirit of this invention.

What is claimed is:

1. A method for preparing dental and medical foam structures having of an improved crosslinked hydrophilic foam having three-diminsional networks, said method consisting essentially of reacting a first component comprising isocyanate capped hydrophilic polyoxyethylene polyol with an isocyanate functionality greater than 2 and a second component comprising water, wherein the $H_2O$ Index Value of said capped polyol and water is about 1,300 to about 78,000, wherein the first component includes a capped polyoxyethylene polyol moiety having an isocyanate functionality of two present in an amount of 0% by weight up to 97% by weight of the first component, and the polyoxyethylene polyol moiety has a weight average molecular weight of about 200 to about 20,000, and a hydroxyl functionality of about 2 to about 8, cooling or drying the prepared foam, and cutting and compressing cooled or dried foam sections.

2. The method of claim 1 wherein the weight average molecular weight is about 600 to about 6,000.

3. The method of claim 1 wherein the $H_2O$ Index Value is from about 4,000 to about 40,000.

4. The product prepared by the method of claim 1.

5. Catamenial devices prepared by the method of claim 1.

6. Tampon devices prepared by the method of claim 1.

7. A method for preparing dental and medical foam structures of an improved crosslinked hydrophilic foam having three-dimensional networks, said method consisting essentially of reacting a first component comprising isocyanate capped hydrophilic polyoxyethylene polyol, having a reaction functionality equal to about two, a second component comprising water, and a third component comprising a crosslinking agent having a reaction functionality greater than two, said crosslinking agent being polyol, polyamine, polythiol or polyisocyanate, and wherein the $H_2O$ Index Value of said capped polyol and water is about 1,300 to about 78,000, said crosslinking agent prior to foaming reaction being non-reactively disposed in the water component or the isocyanate capped component, cooling or drying the prepared foam, and cutting and compressing cooled or dried foam sections.

8. The method of claim 7 wherein the $H_2O$ Index Value is from about 4,000 to about 40,000.

9. The method of claim 7 wherein the crosslinking agent of the third component is a polyamine.

10. The product prepared by the method of claim 7.

11. Catamenial devices prepared by the method of claim 7.

12. Tampon devices prepared by the method of claim 7.

* * * * *